(12) United States Patent
Babakian et al.

(10) Patent No.: US 11,799,899 B2
(45) Date of Patent: Oct. 24, 2023

(54) CONTEXT-AWARE DOMAIN NAME SYSTEM (DNS) QUERY HANDLING

(71) Applicant: VMware, Inc., Palo Alto, CA (US)

(72) Inventors: Andrew Babakian, San Francisco, CA (US); Emad Benjamin, San Jose, CA (US); Pere Monclus, Morgan Hill, CA (US)

(73) Assignee: VMWARE, INC., Palo Alto, CA (US)

( * ) Notice: Subject to any disclaimer, the term of this patent is extended or adjusted under 35 U.S.C. 154(b) by 671 days.

(21) Appl. No.: 16/516,649

(22) Filed: Jul. 19, 2019

(65) Prior Publication Data

US 2021/0021634 A1    Jan. 21, 2021

(51) Int. Cl.
| | | |
|---|---|---|
| *H04L 29/06* | (2006.01) | |
| *H04L 9/40* | (2022.01) | |
| *G06F 9/455* | (2018.01) | |
| *H04L 61/2567* | (2022.01) | |
| *H04L 61/4511* | (2022.01) | |

(52) U.S. Cl.
CPC ...... *H04L 63/1441* (2013.01); *G06F 9/45558* (2013.01); *H04L 61/2567* (2013.01); *H04L 61/4511* (2022.05); *H04L 63/1416* (2013.01); *H04L 63/1425* (2013.01); *G06F 2009/45587* (2013.01); *G06F 2009/45595* (2013.01)

(58) Field of Classification Search
CPC ............ H04L 63/1416; H04L 63/1425; H04L 63/1441; H04L 61/1511; H04L 61/2567; G06F 9/45558
See application file for complete search history.

(56) References Cited

U.S. PATENT DOCUMENTS

2014/0245439 A1 * 8/2014 Day ...................... G06F 21/577
                                                          726/23
2020/0314067 A1 * 10/2020 Rudnik ............... H04L 63/0236

* cited by examiner

*Primary Examiner* — Jeffrey C Pwu
*Assistant Examiner* — Thong P Truong
(74) *Attorney, Agent, or Firm* — SU IP CONSULTING

(57) ABSTRACT

Example methods are provided a computer system to perform context-aware domain name system (DNS) query handling in a software-defined networking (SDN) environment. One example method may comprise detecting a DNS query to translate a domain name; identifying DNS record information that translates the domain name to a network address assigned to a virtualized computing instance; and identifying context information that is associated with the virtualized computing instance and mapped to the DNS record information. The method may also comprise: in response to detecting a potential security threat based on the context information, performing a remediation action to block access to the virtualized computing instance; but otherwise, generating and sending a DNS reply specifying the network address assigned to allow access to the virtualized computing instance.

21 Claims, 8 Drawing Sheets

CONTEXT-AWARE DOMAIN NAME SYSTEM (DNS) QUERY HANDLING

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, Domain Name System (DNS) allows a client (e.g., user device, VM) to use domain names instead of numerical addresses to connect with a server. When the client needs to access the server (e.g., VM) by its domain name, the client needs to have the domain name translated to an actual routable address through DNS querying. However, there is a risk that the client and/or server have gone rogue, which may expose other entities in the SDDC to malicious attacks.

DETAILED DESCRIPTION

Figure 1:
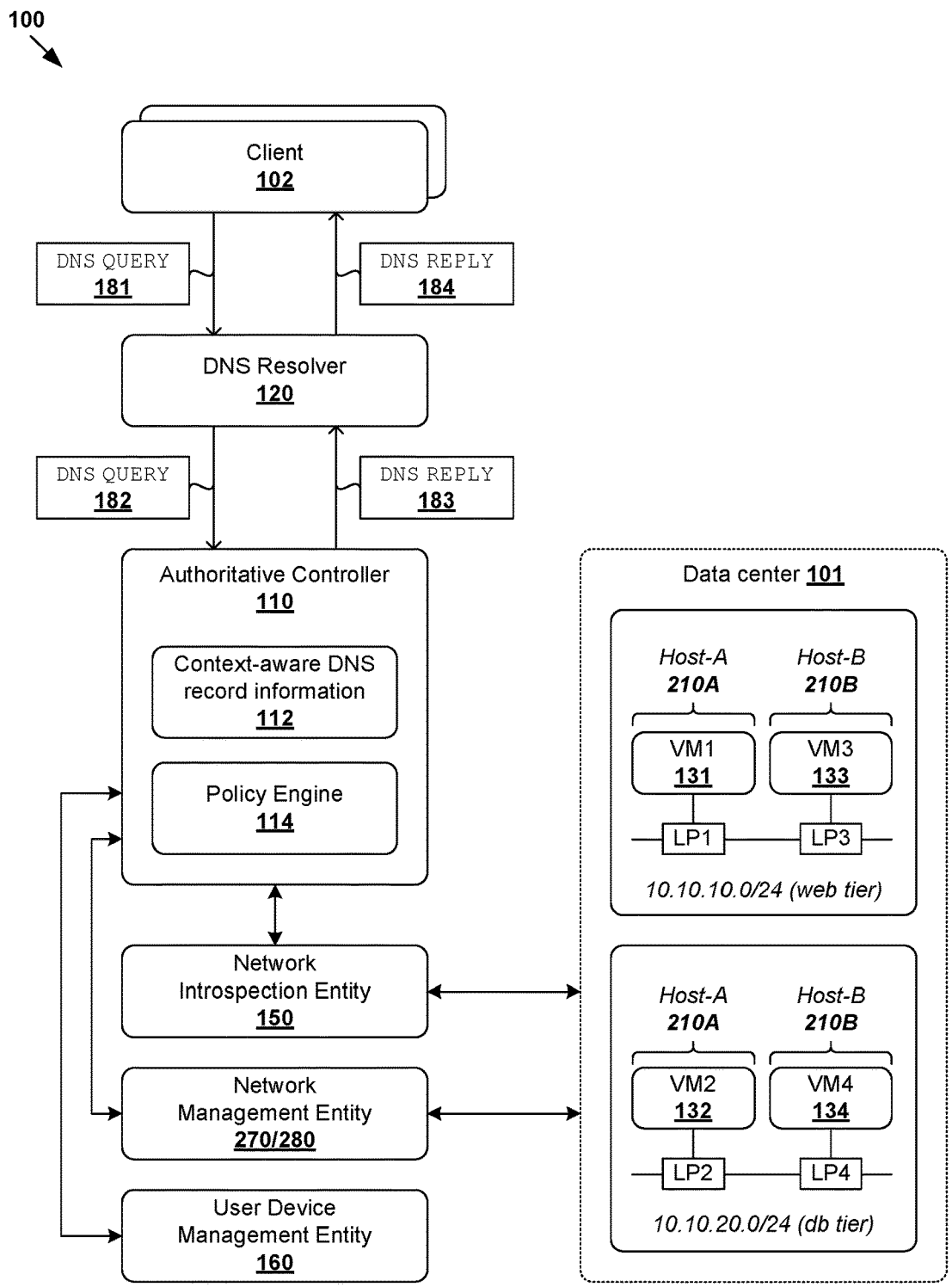
FIG. 1 is a schematic diagram illustrating an example software-defined networking (SDN) environment in which context-aware domain name system (DNS) query handling may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to data center security and domain name system (DNS) will now be explained in more detail using FIG. 1, which is a schematic diagram illustrating example software-defined networking (SDN) environment 100 in which context-aware DNS query handling may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

In the example in FIG. 1, SDN environment 100 includes multiple hosts 210A-B that support various virtualized computing instances in the form of virtual machines (VMs) 131-134. For example, host-A 210A supports VMs 131-132, and host-B 210B supports VMs 133-134. In practice, SDN environment 100 may include any number of hosts (also known as a "host computers", "host devices", "physical servers", "server systems", "transport nodes," etc.), where each host may be supporting tens or hundreds of virtual machines (VMs).

VMs 131-134 may be deployed as network nodes in data center 101 to implement a multi-node application whose functionality is distributed over multiple network nodes. For example, VM1 131 and VM3 133 may be web servers that belong to a "web tier" of the multi-node application. In another example, VM2 132 and VM4 134 may be database servers that belong to a "database tier" of the multi-node application. Depending on the desired implementation, multiple network nodes may implement the same functionality to improve performance and fault tolerance, in which case a load balancer (not shown) may be deployed to distribute traffic among those network nodes using any suitable algorithm (e.g., round robin, least connection, chained failover, source IP address hash, etc.).

Figure 2:
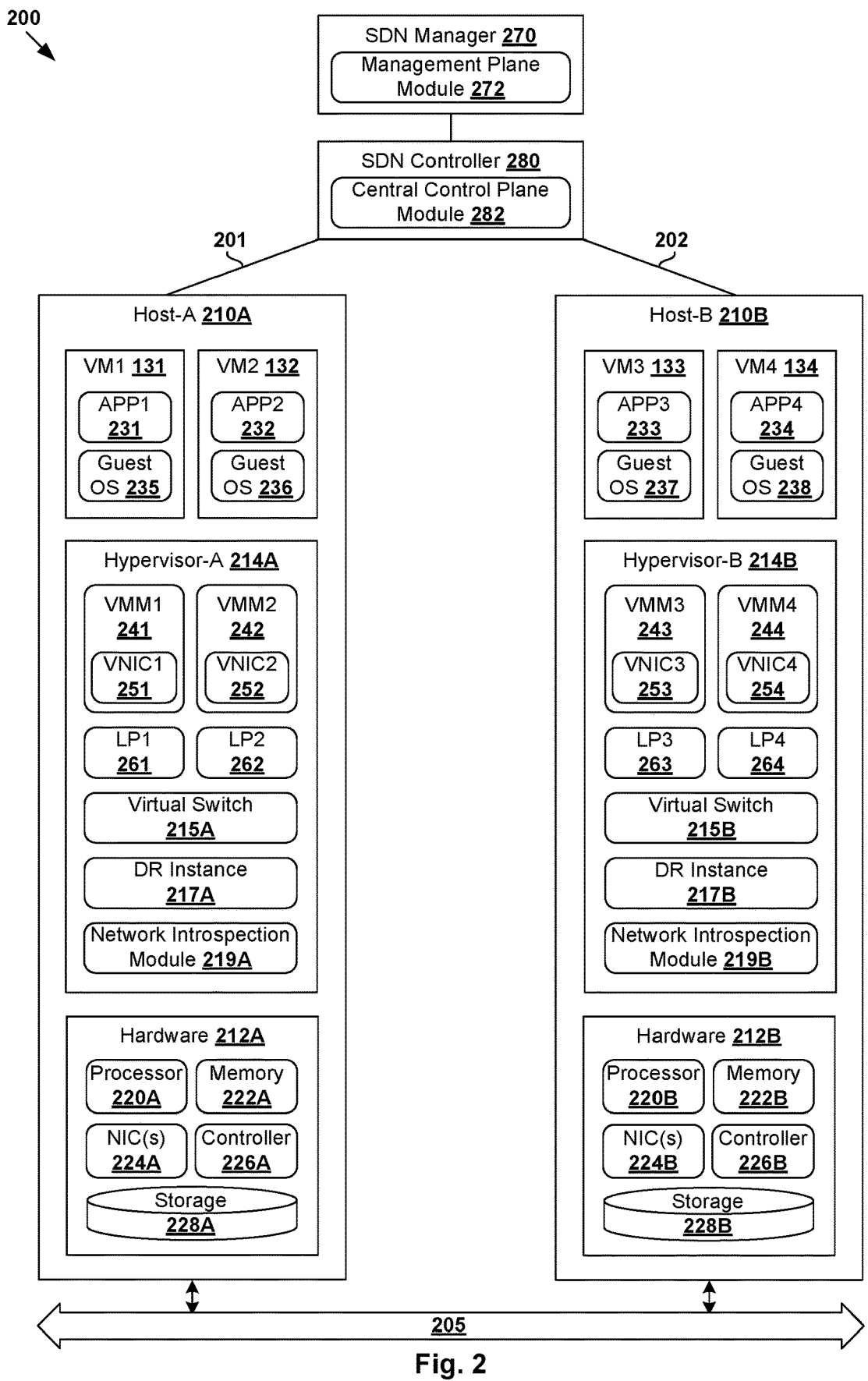
FIG. 2 is a schematic diagram illustrating a physical implementation view of hosts in the SDN environment in FIG. 1.

Hosts 210A-B will be explained in more detail using FIG. 2, which is a schematic diagram illustrating physical implementation view 200 of example SDN environment 100 in FIG. 1. Each host 210A/210B may include suitable hardware 212A/212B and virtualization software (e.g., hypervisor-A 214A, hypervisor-B 214B) to support respective VMs 131-134. Hypervisor 214A/214B maintains a mapping between underlying hardware 212A/212B and virtual resources allocated to respective VMs. Hardware 212A/212B includes suitable physical components, such as central processing unit(s) (CPU(s)) or processor(s) 220A/220B; memory 222A/222B; physical network interface controllers (NICs) 224A/224B; storage controller(s) 226A/226B; and storage disk(s) 228A/228B, etc.

Virtual resources are allocated to VMs 131-134 to support respective application(s) 231-234 and guest operating systems 235-238. For example, the virtual resources may include virtual CPU, guest physical memory, virtual disk, virtual network interface controller (VNIC), etc. Hardware resources may be emulated using virtual machine monitors (VMMs). For example in FIG. 2, VNICs 251-254 are virtual network adapters for VMs 131-134, respectively, and are emulated by corresponding VMMs 241-244 instantiated by their respective hypervisors 214A-B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 and VM3 133 (e.g., web tier) may be deployed in one logical network and connected via a first logical switch. VM2 132 and VM4 134 (e.g., database tier) may be deployed in another logical network and connected via a second logical switch.

Hypervisor 214A/214B implements virtual switch 215A/215B and logical distributed router (DR) instance 217A/217B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 215A-B and represented internally using forwarding tables (not shown) at respective virtual switches 215A-B. The forwarding tables may each include entries that collectively implement the respective logical switches. Further, logical DRs that provide logical layer-3 connectivity may be implemented collectively by DR instances 217A-B and represented internally using routing tables (not shown) at respective DR instances 217A-B. The routing tables may each include entries that collectively implement the respective logical DRs.

Packets may be received from, or sent to, each VM via an associated logical port. For example, logical switch ports 261-264 are associated with respective VMs 131-134. Here, the term "logical port" or "logical switch port" may refer generally to a port on a logical switch to which a virtualized computing instance is connected. A "logical switch" may refer generally to an SDN construct that is collectively implemented by virtual switches 215A-B in FIG. 2, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Hosts 210A-B may maintain data-plane connectivity with each other via physical network 205, and control-plane connectivity with network management entities 270-280 via respective control-plane channels 201-202. One example of SDN controller 280 is the NSX controller component of VMware NSX® (available from VMware, Inc.) that operates on a central control plane. SDN controller 280 may be a member of a controller cluster (not shown for simplicity) that is configurable using SDN manager 270 operating on a management plane. Network management entity 270/280 may be implemented using physical machine(s), VM(s), or both.

Referring to FIG. 1 again, DNS allows some servers to be accessed by client 102 using domain names instead of numerical addresses. In practice, the term "client" may refer generally to any suitable computer system that may require access to a server. Client 102 may be a VM (see FIGS. 5-6), a container, a user device (see FIGS. 7-8), or any other network node. Consider a scenario where client 102 wishes to access VM1 131 (e.g., to access functionality implemented by APP1 231). Prior to client-server connection establishment, client 102 may send a DNS query to DNS resolver 120. The DNS query is to request for a translation of a domain name (e.g., www.xyz.com) to a routable network address (e.g., IP address=IP-1) assigned to VM1 131.

DNS resolver 120 may then forward the DNS query to authoritative controller 110, which may then respond with a DNS reply. Authoritative controller 110 may represent an authoritative name server that maintains DNS records and responds to DNS queries for domain names for a particular DNS zone it is responsible for. In practice, DNS resolver 120 may be a "recursive resolver" (also known as a "DNS recursor") that operates as the first stop for a DNS query. After receiving a DNS query from a client, a recursive resolver will either respond with cached data, or execute a sequence of iterative queries in the case of a cache miss. In the latter case, DNS resolver 120 may send respective queries to a root name server (not shown), a top-level domain (TLD) name server (not shown), and finally to authoritative controller 110. After receiving a DNS reply from authoritative controller 110, DNS resolver 120 may send a DNS reply containing the requested IP address (e.g., IP-1) and a time to live (TTL) parameter to client 102. This way, client 102 may start communicating with a server (e.g., VM1 131) using the requested IP address.

One of the challenges in SDN environment 100 is improving the overall network security. For example in FIG. 1, servers (e.g., VMs 131-134) and/or client 102 are susceptible to malicious attacks such as malware infection. In practice, the term "malware" is used as an umbrella term to cover various forms of hostile or intrusive software, such as viruses, worms, Trojan horse programs, spyware, phishing, adware, riskware, rookits, spams, scareware, ransomware, a combination thereof, etc. Conventionally, authoritative controller 110 and DNS resolver 120 may not be aware of whether servers and/or clients have been compromised. In this case, the DNS query handling process may inadvertently facilitate access to rogue entities, which may in turn expose more entities to malicious attacks.

Context-Aware DNS Query Handling

According to examples of the present disclosure, a "context-aware" approach for DNS query handling may be implemented to improve security threat mitigation in SDN environment 100. For example, DNS record information associated with a server (e.g., VM1 131) may be mapped to its context information, which may be used to detect any potential security threats during DNS query handling. This way, DNS query handling may be used as a form of access control to improve network security.

Figure 3:
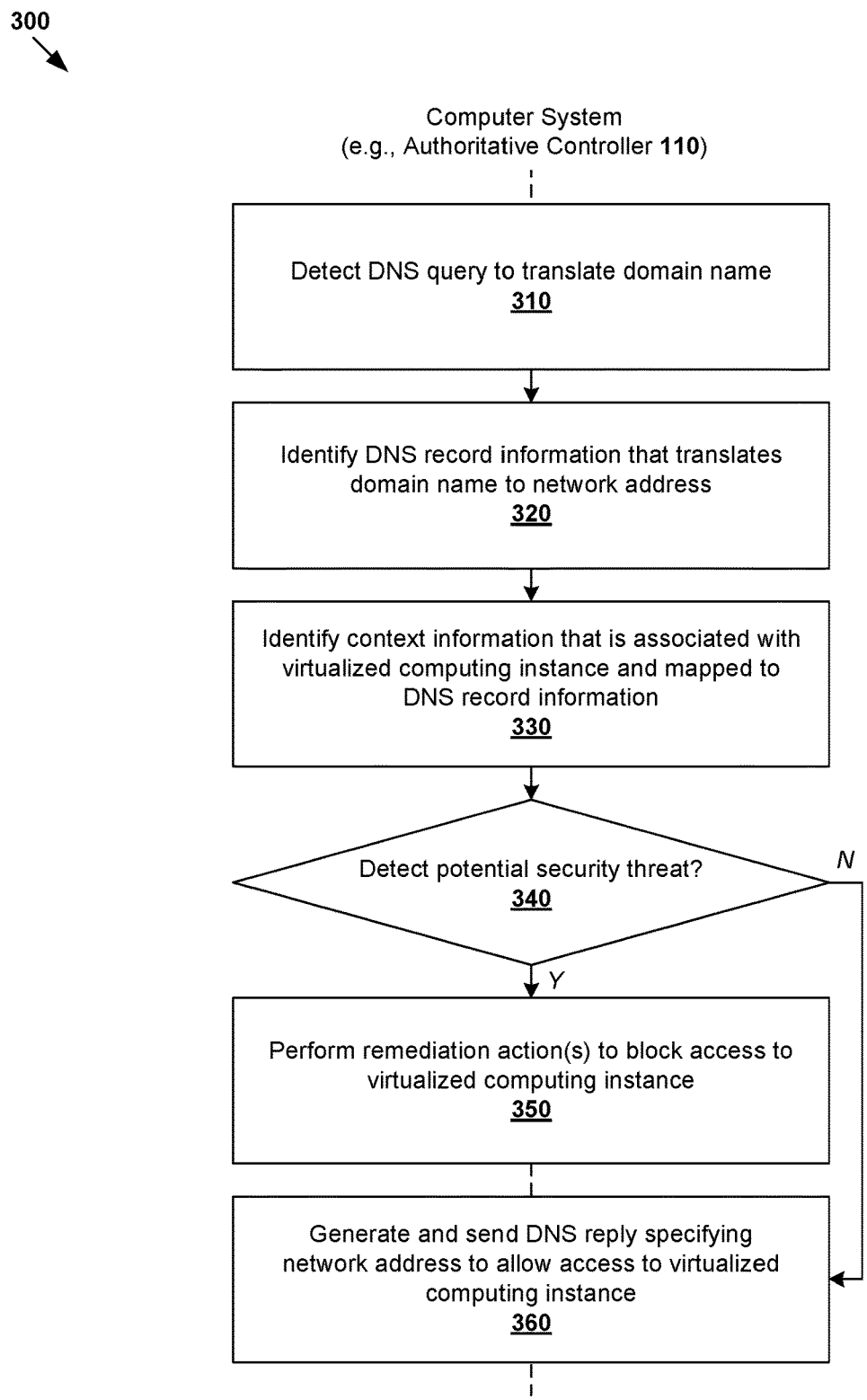
FIG. 3 is a flowchart of an example process for a computer system to perform context-aware DNS query handling in an SDN environment.

In more detail, FIG. 3 is a flowchart of example process 300 for a computer system to perform context-aware DNS query handling in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. Examples of the present disclosure may be implemented by any suitable "computer system," such as authoritative controller 110, DNS resolver 120, a combination of both, etc. In the following, various examples will be discussed using VMs 131-132 as example "virtualized computing instances" or "servers" that is accessible using a domain name.

At 310 in FIG. 3, authoritative controller 110 may detect a DNS query to translate a domain name. In the example in FIG. 1, the DNS query (see 181-182) may be initiated by client 102 requiring access to a domain name (e.g., www.xyz.com), and forwarded to authoritative controller 110 via DNS resolver 120.

At 320 and 330 in FIG. 3, authoritative controller 110 may identify DNS record information and context information that is mapped to the DNS record information (see 112 in FIG. 1). The DNS record information translates the domain name to a network address (e.g., IP-1) assigned to VM1 131 supporting APP1 231.

At 340 and 350, in response to detecting a potential security threat based on the context information, authoritative controller 110 may perform remediation action(s) to block access to VM1 131. Otherwise, at 360, a DNS reply (see 183-184) specifying the network address (e.g., IP-1) assigned to VM1 131 may be generated and sent to allow access to VM1 131.

As will be discussed using FIGS. 4-6, any suitable "remediation action" may be performed to block access to VM1 131. In a first example, VM3 133 may be a "standby virtualized computing instance" to which traffic may be directed. In this case, the remediation action may involve redirecting client 102 to a standby network address (e.g., IP-3) by generating and sending a DNS reply specifying the standby network address assigned to VM3 133. In a second example, the remediation action may involve translating the domain name (www.xyz.com) to another (standby) domain name (e.g., abcd_patched_version_app.xyz.com). In a third example, a notification may be generated and sent to network management entity 270/280 to cause isolation of VM1 131 using firewall rule(s). In a fourth example, the remediation action may involve returning nothing back to client 102, thereby blocking access.

As will be discussed using FIGS. 4-6, any suitable "context information" may be used for detecting potential security threat(s), such as information relating to an intended state associated with VM1 131, a runtime state associated with VM1 131, etc. In this case, based on that the context information, a deviation between the intended state and runtime state may be identified to detect the potential security threat. In practice, the context information associated with VM1 131 may be obtained from various entities in SDN environment, such as network introspection entity 150, network management entity 270/280, etc.

Additionally, a "client-side approach" may be implemented to detect any potential security threat associated with client 102 to protect servers (e.g., VM1 131) against rogue client 102. As will be discussed using FIGS. 7-8, "client context information" may be obtained from user device management entity 160 to detect a potential security threat associated with client 102. For example, client 102 may be a user device (e.g., mobile device, laptop or tablet computer, desktop computer, etc.). In this case, the client context information may include one or more of the following: hardware profile information (e.g., device type), software profile information (e.g., software version, list of frequently-used applications, jailbreak status, etc.), geographical location information (e.g., location=Sydney), user profile information (e.g., user's role and permission), etc.

According to examples of the present disclosure, context information associated with servers (e.g., VM1 131) and/or clients (e.g., 102) may be used to detect potential security threats. Using a server-side approach, healthy client 102 may be protected from an "unhealthy" server (e.g., VM1 131) and redirected to an alternative "healthy" server (e.g., VM3 133) instead. Using a client-side approach, a healthy server (e.g., VM1 131) may be protected from unhealthy client 102. In both cases, context-aware DNS query handling may be used for security threat mitigation to reduce the attack surface in SDN environment 100. Examples of the present disclosure may be implemented to invoke security controls and provide an indirect actuation in SDN environment 100, irrespective of where clients and servers are deployed. Various examples will be explained below.

Server-Side Example

Figure 4:
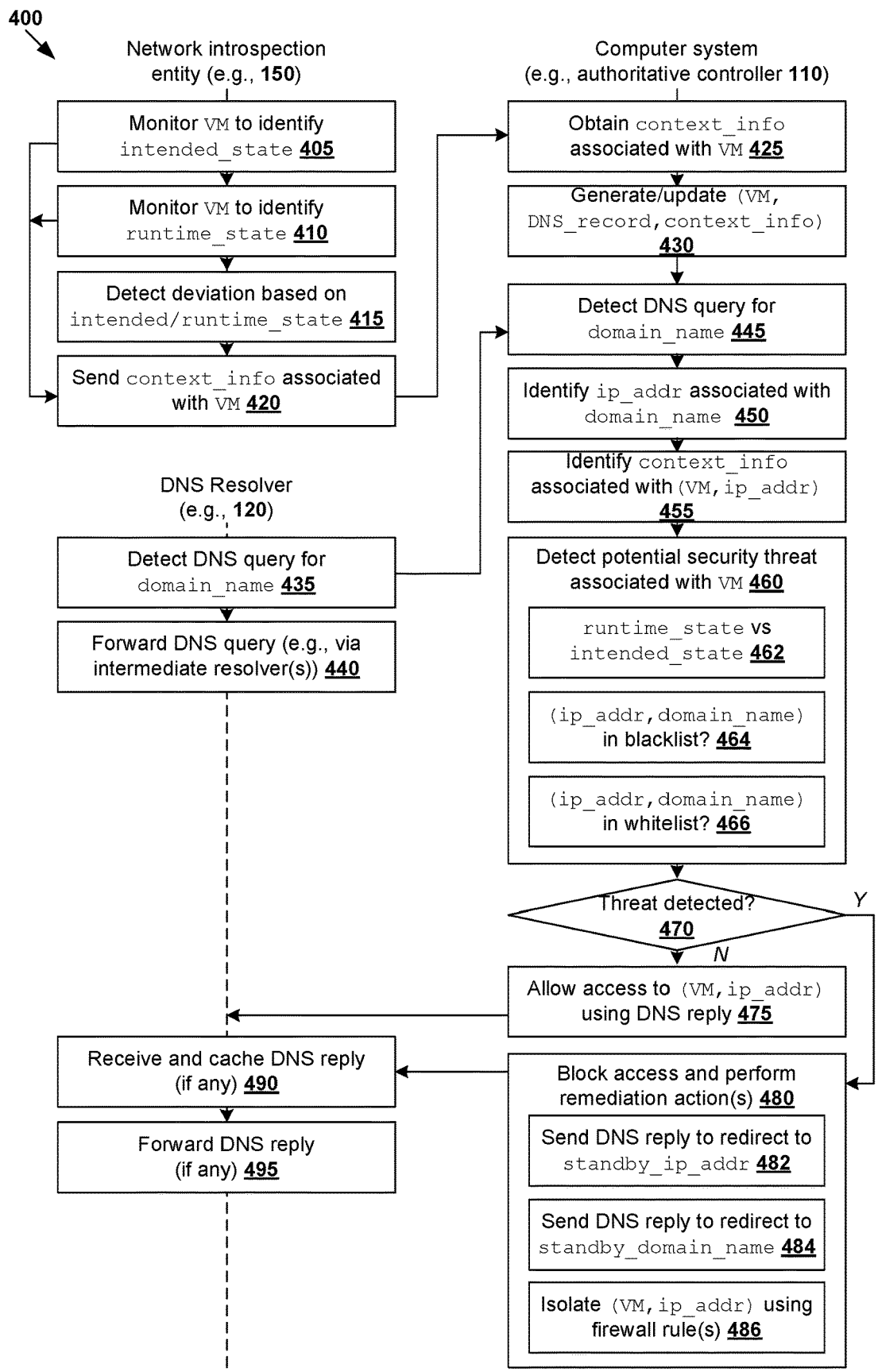
FIG. 4 is a flowchart of an example detailed process for context-aware DNS query handling in an SDN environment according to a server-side approach.

FIG. 4 is a flowchart of example detailed process 400 for context-aware DNS query handling in SDN environment 100 according to a server-side approach. Example process 400 may include one or more operations, functions, or actions illustrated at 405 to 495. The various operations, functions or actions may be combined into fewer blocks, divided into additional blocks, and/or eliminated depending on the desired implementation. Various examples will be explained using FIG. 5 and FIG. 6. FIG. 5 is a schematic diagram illustrating first example 500 of context-aware DNS query handling in SDN environment 100 according to a server-side approach. FIG. 6 is a schematic diagram illustrating second example 600 of context-aware DNS query handling in SDN environment 100 according to a server-side approach.

(a) Context Information

At 405 in FIG. 4, network introspection entity 150 may monitor VMs 131-134 to identify or establish their normal operational behavior (i.e., intended state). Any suitable approach may be used for network monitoring, such as using VMware's AppDefense™, etc. For example, network introspection entity 150 may interact with hypervisor 214A/214B (see network introspection module 219A/219B in FIG. 2) and/or guest OS 235-238 (e.g., via an agent executed by each guest OS). To establish their intended state, network introspection entity 150 may monitor VMs 131-134 and respective applications 231-234 for a period of time.

At 410-415 in FIG. 4, network introspection entity 150 may monitor VMs 131-134 to identify or establish their runtime operational behavior (i.e., runtime state), and compare the runtime state against their corresponding intended state. This way, any deviation between the intended state and the runtime state may be identified. In practice, some deviations or anomalies may be identified to be legitimate changes due to system updates or software patching, whereas others could potentially real threats.

At 420 in FIG. 4, network introspection entity 150 may generate and send context information associated with VMs 131-134 to authoritative controller 110. Although not shown in FIG. 4 for simplicity, network introspection entity 150 may also perform any suitable action, such as suspending or shutting down a VM, generating a snapshot of the VM, alerting an entity (e.g., program or user) responsible for investigating threats, etc.

Depending on the desired implementation, the context information may specify any of the following fingerprint information associated with a workload (e.g., VM or container): OS kernel behavior information (e.g., to monitor OS kernel integrity based on an expectation of module(s) being executed); process behavior information (e.g., process network attestation in terms of all egress/ingress processes that have established network connections); process ID information (e.g., historical visibility of all processes that are running inside the workload); network flow information (e.g., ingress/egress network flows to monitor network-level communication), UUID and/or IP address information for identifying the workload, etc. In practice, process ID monitoring may also provide visibility as to how a process ID might be exploited by a new process (e.g., malware or command control).

(b) Context-Aware DNS Record Information

At 425 in FIG. 4, authoritative controller 110 may obtain context information (see 510 in FIG. 5) associated with server=VM 131/133 from network introspection entity 150. The context information may specify the intended state of VM 131/133, runtime state of VM 131/133, deviation(s) between the intended state and runtime state, or any combination thereof. Additionally, authoritative controller 110 may obtain identification information (see 520 in FIG. 5) associated with VM 131/133 from SDN manager 270 and/or SDN controller 280, such as their UUID, IP address, MAC address, logical network information, etc.

At 430 in FIG. 4, authoritative controller 110 (e.g., using policy engine 114) may generate context-aware DNS record information (see 530 in FIG. 5) by mapping DNS record information associated with VM 131/133 to their context information. The context-aware DNS record information (see 112) provides a one-to-one mapping between DNS information record(s) associated with VM 131/133, and context information associated with VM 131/133. In practice, context-aware DNS record information may be updated dynamically at block 430 based on any updated context information.

In practice, the term "DNS record information" may refer to resource record(s) that provide information about a specific resource. For example, an address (A, AAAA) record specifies an IP version 4 (IPv4) address or IP version 6 (IPv6) address that is mapped to a domain name. A CNAME record specifies redirection to another domain name. A reverse-lookup pointer (PTR) record specifies a domain name associated to an IP address. A host information (HINFO) record specifies general information about a host (e.g., OS information). A name server (NS) record specifies an authoritative name server for a given host. An integrated services digital network (ISDN) record specifies an ISDN address for a host. A service (SRV) record specifies a hostname and a port number of a particular service, etc.

Figure 5:
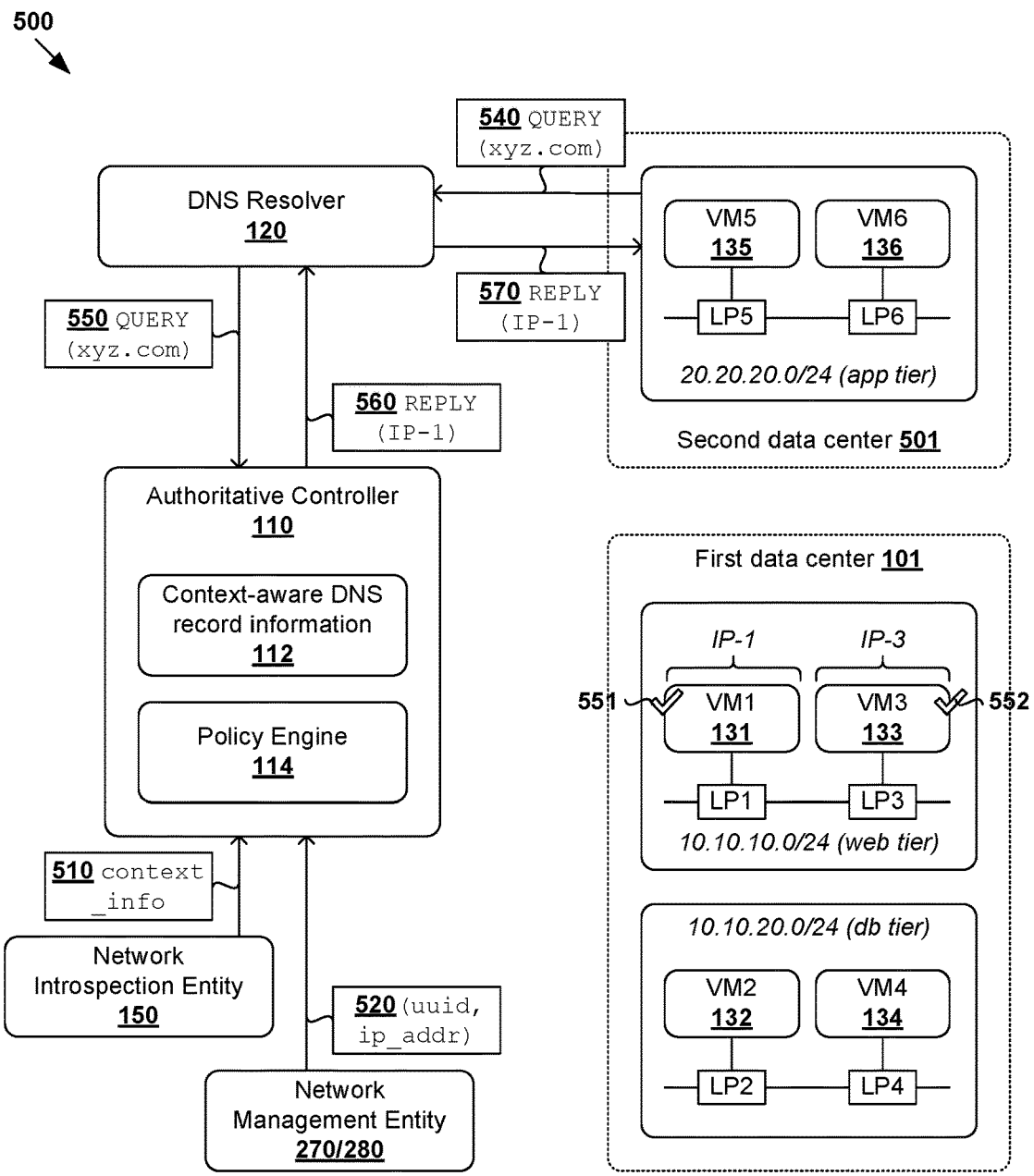
FIG. 5 is a schematic diagram illustrating a first example of context-aware DNS query handling in an SDN environment according to a server-side approach.

In the example in FIG. 5, domain name=www.xyz.com may be mapped to both VM1 131 and VM3 133. At 531, context-aware DNS record information is generated by mapping a DNS record (domain name=www.xyz.com, IP-1) to context information (labelled "context-1") associated with VM1 131. At 532, context-aware DNS record information is generated by mapping another DNS record (domain name=www.xyz.com, IP-3) to context information (labelled "context-3") associated with VM3 133. The context information (e.g., context-1 and context-3) may be stored in any suitable form, such as a unique ID that is generated based on (OS kernel behavior information, process behavior information, process ID information, network flow information) discussed at block 420.

The context information (e.g., context-1 and context-3 in FIG. 5) may be used to derive a health status associated with a workload (e.g., VM, container). In the case of semantic DNS, a "semantic name" may refer generally to a name that has been decorated with additional metadata that implies its intended behavior. The metadata represents an abstraction of various resources, such as application processes, virtualization-based processes, network communication processes, or any other functionality that may be associated with the workload, etc. For example, a semantic CNAME may include (CNAME, fingerprint metadata), where the "fingerprint" (or DNA) represents metadata associated with what is running of the workload. In practice, semantic DNS may be implemented for other types of records, such as A, AAAA, etc.

To implement semantic DNS, there may be two top-level steps: (1) generate a fingerprint associated with a workload and (2) add semantic to the fingerprint's metadata. In relation to the first step, the fingerprint may be generated through recursive traversal of what is running on the workload, such as a long string representing all directory structures and associated processes. As explained at block 420, the fingerprint information may include OS kernel behavior information, process behavior information, process ID information, network flow information, UUID and/or IP address information, or any combination thereof, etc.

In relation to the second step, the semantic connection or interpretation may involve inquiring an existing cache of predefined tokens, token cache (i.e., tokens learnt over time by the system and authenticated by a rinsing system) for specific words that exists in the fingerprint information. For example, if particular word or token (e.g., "commons-codec-1.11") appears in a partial copy of a fingerprint, then a semantic CNAME decoration process may involve querying the token cache to determine whether the token has been flagged as suspicious in the past, or it has the right to access, and any other suitable security-based properties defined by the user. This way, a health status associated with the workload may be derived, such as healthy (see 531/532 in FIG. 2) or unhealthy (see 620 in FIG. 6 to be discussed below).

(c) Context-Aware DNS Query Handling

Context-aware DNS record information 530 may be used during DNS query handling as a form of security control. In the following, consider a scenario where client=VM5 135 wishes to access server=VM1 131 using domain name=www.xyz.com. In the example in FIG. 5, VM5 135 and VM6 136 may be application servers (i.e., application tier) that are deployed on second data center 502. Note that data center 101/502 may be deployed on a private cloud platform (e.g., on-premise SDDC), a public cloud platform, or a combination of both. A public cloud platform may be implemented using any suitable cloud technology, such as Amazon Web Services® (AWS) and Amazon Virtual Private Clouds (VPCs); VMware Cloud™ (VMC) on AWS; Microsoft Azure®; Google Cloud Platform™, IBM Cloud™; a combination thereof, etc. Amazon VPC and Amazon AWS are registered trademarks of Amazon Technologies, Inc.

Referring to FIG. 4 again, at 435-440 in FIG. 4, in response to detecting a DNS query for domain name=www.xyz.com initiated by client=VM5 135, DNS resolver 120 may forward the DNS query to authoritative controller 110. In practice, DNS resolver 120 may first check whether the DNS query may be satisfied using cached information. In not (i.e., cache miss), the DNS query will be forwarded to authoritative controller 110. See DNS query 540-550 in FIG. 5.

At 450-455 in FIG. 4, in response to detecting the DNS query from DNS resolver 120, authoritative controller 110 may identify context-aware DNS record information 531, which maps DNS record information (www.xyz.com, IP-1) with context information (i.e., context-1) associated with VM1 131. At 460-470 in FIG. 4, based on the context information, authoritative controller 110 may detect whether there is a potential security threat associated with VM1 131. If yes (see 480), access to VM1 131 is blocked, but otherwise (see 470), access is allowed.

Depending on the desired implementation, block 460 may involve determining whether the context information indicates any deviation between an intended state and a runtime state (see 462). Block 460 may also involve checking whether domain name=www.xyz.com and/or IP-1 are included in a blacklist (see 464) or a whitelist (see 466). If found in the blacklist, access will be automatically blocked. If not found in the whitelist, access will also be automatically blocked.

At 470 (yes) and 480 in FIG. 4, in response to detecting a potential security threat based on the context information, authoritative controller 110 may block access to VM1 131 and perform remediation action(s). Otherwise, at 475, access is allowed by generating and sending a DNS reply to client=VM5 135 via DNS resolver 120.

In the example in FIG. 5, both VM1 131 and VM3 133 are determined to be "healthy" (see 551-552) based on their context information. For example, VM 131/133 may be considered "healthy" when behaving normally or as expected during runtime. In contrast, VM 131/133 may be considered "unhealthy" (or compromised) when deviation or anomaly is detected during runtime. In this case, a DNS reply (see 560-570) specifying the requested IP address=IP-1 is sent, thereby allowing application server VM5 135 to access web server VM1 131. DNS resolver 120 may then cache the DNS reply for future DNS queries for the same domain name, and forward the DNS reply to VM5 135 according to blocks 490-495.

(d) Blocking Access

Figure 6:
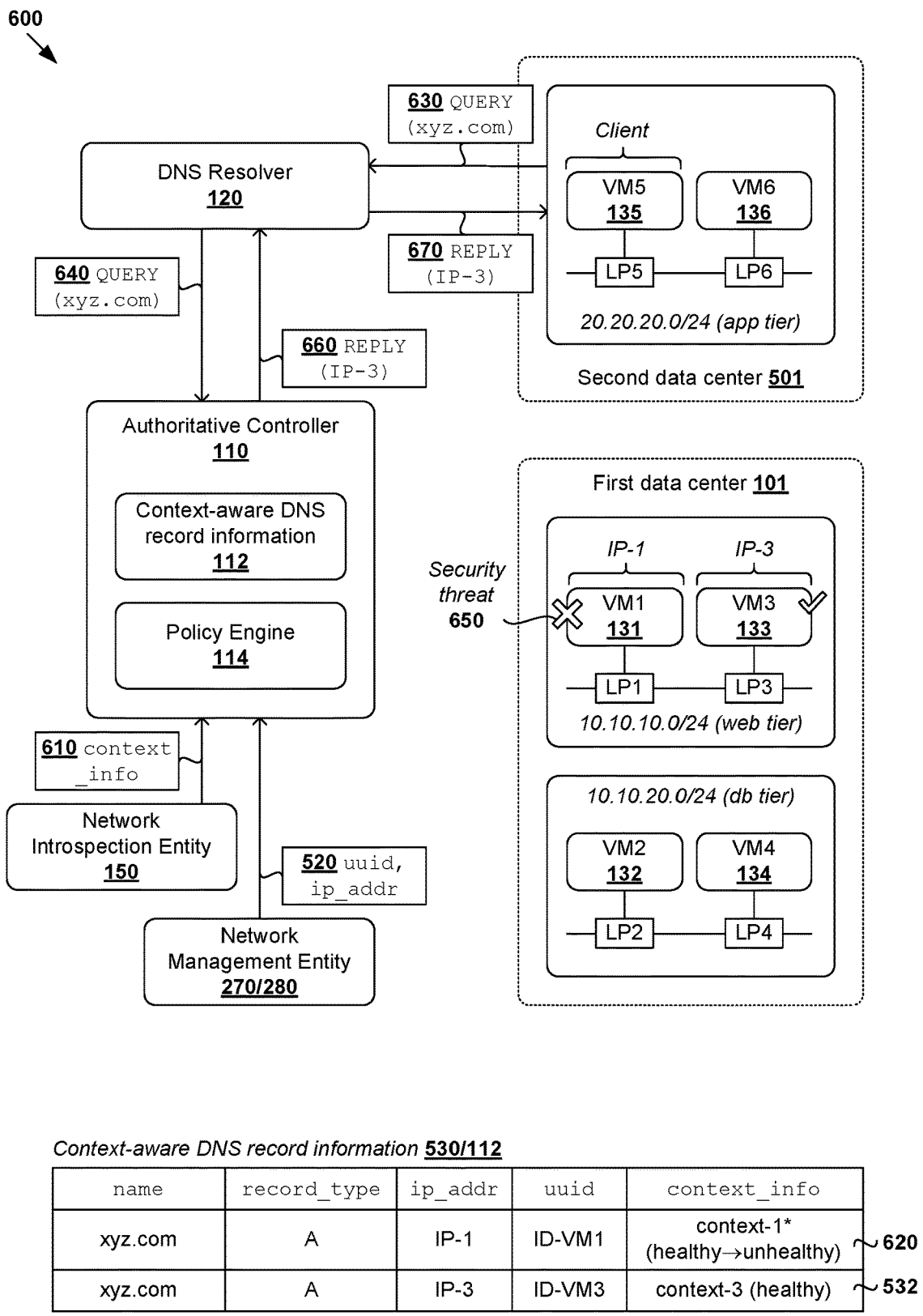
FIG. 6 is a schematic diagram illustrating a second example of context-aware DNS query handling in an SDN environment according to a server-side approach.

In another example in FIG. 6, VM1 131 is determined to be "unhealthy" based on updated context information (see 610) from network introspection entity 150. In this case, context-aware DNS record information 531/620 associated with VM1 131 may be updated according to block 430. In response to detecting a DNS query (see 630-640) initiated by client=VM5 135, authoritative controller 110 may detect a potential security threat (see 650) based on updated context-aware DNS record information 620, which indicates that VM1 131 is now "unhealthy."

According to block 480, authoritative controller 110 may block access to VM1 131 and perform remediation action(s). In one example (see 482), authoritative controller 110 may redirect to a standby IP address (e.g., IP-3) associated with standby web server=VM3 133, which is "healthy" based on context-aware DNS record information 532. See 660-670 in FIG. 6. In another example (see 484), a redirection to a standby or specific domain name (e.g., abcd_patched_version_app.xyz.com) may be initiated. Using semantic DNS explained above using blocks 425-430, additional DNS record information may be configured to have the necessary syntax and semantic of names to ensure redirection to healthy servers. Depending on the desired implementation, the remediation action may involve returning nothing back to VM5 135, thereby blocking access to VM1 131.

Further (see 486), a notification may be generated and sent to network management entity 270/280 to cause isolation of VM1 131 using firewall rule(s). For example, hypervisor 214A on host-A 210A may implement a distributed firewall (DFW) engine to filter packets to and from VM1 131. SDN controller 160 may be used to configure firewall rules that are enforceable by the DFW engine on host-A 110A. Firewall rules may be defined using five tuples to match a specific packet flow, such as source IP address, source port number (PN), destination IP address, destination PN, and protocol, in addition to an action (e.g., allow or block).

Client-Side Example

Figure 7:
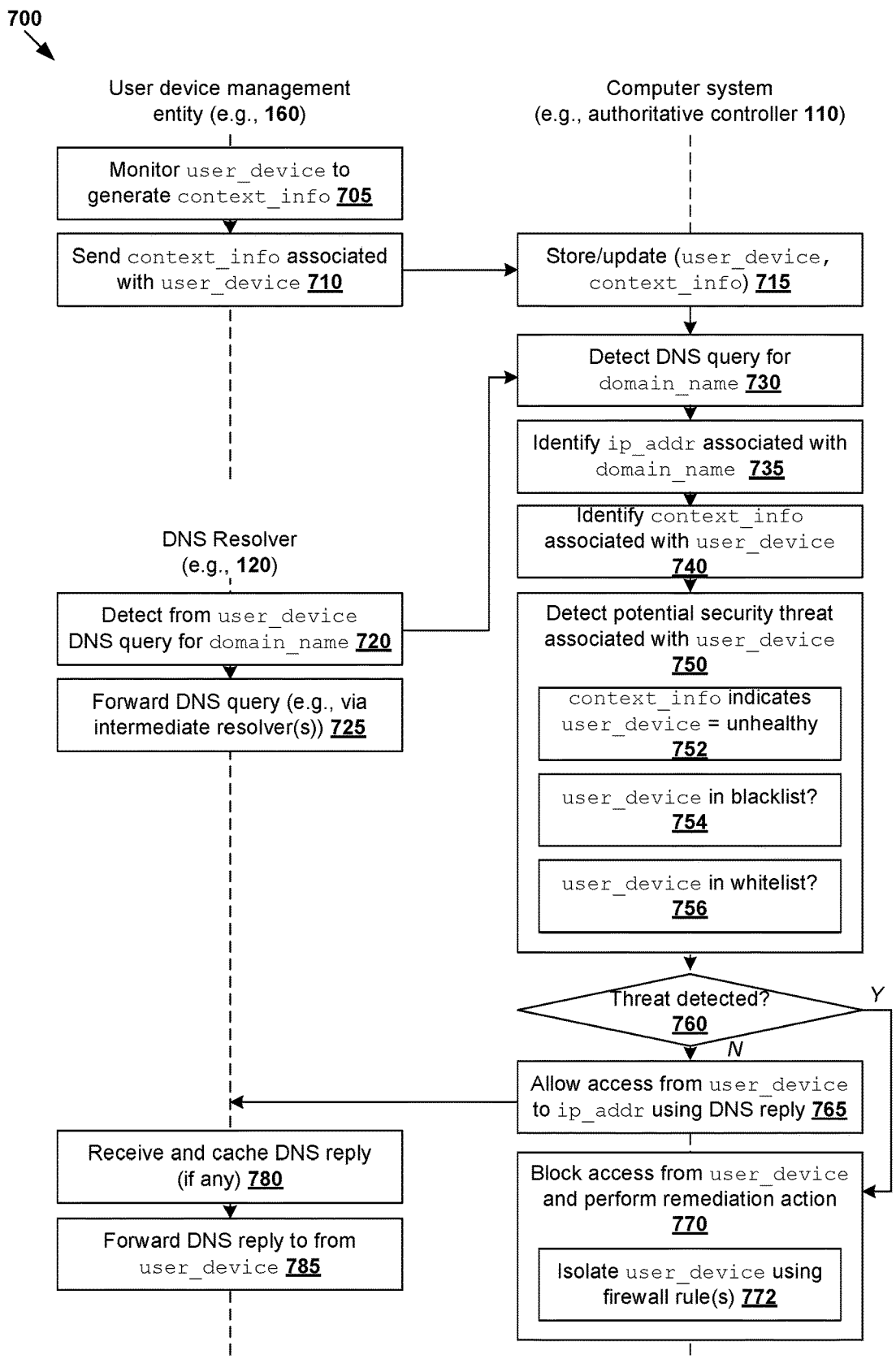
FIG. 7 is a flowchart of an example detailed process for context-aware DNS query handling in an SDN environment according to a client-side approach.

FIG. 7 is a flowchart of example detailed process 700 for context-aware DNS query handling in SDN environment 100 according to a client-side approach. Example process 700 may include one or more operations, functions, or actions illustrated at 705 to 785. The various operations, functions or actions may be combined into fewer blocks, divided into additional blocks, and/or eliminated depending on the desired implementation. Various examples will be explained using FIG. 8, which is a schematic diagram illustrating example 800 of context-aware DNS query handling in SDN environment 100 according to a client-side approach.

Figure 8:
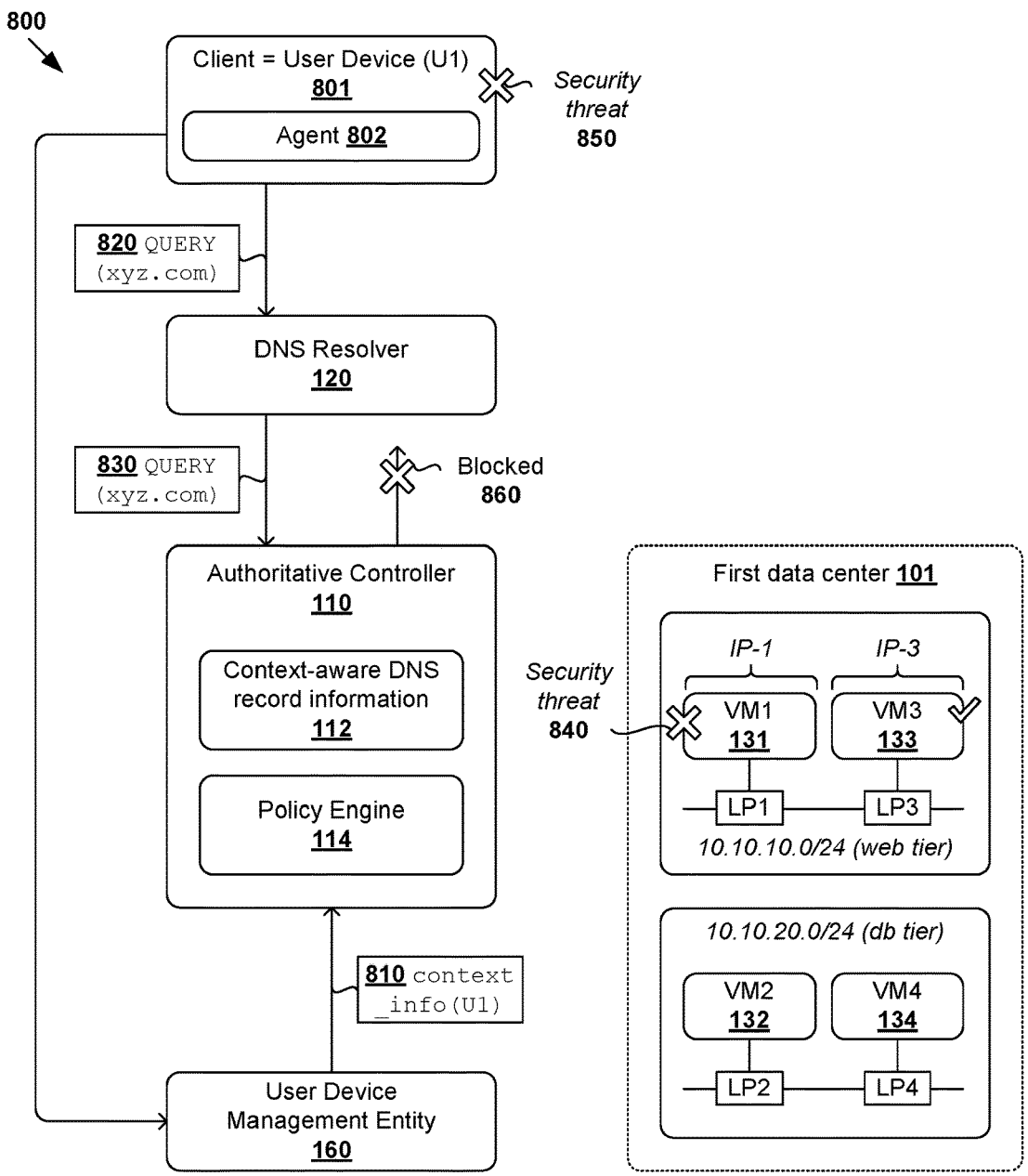
FIG. 8 is a schematic diagram illustrating an example of context-aware DNS query handling in an SDN environment according to a client-side approach.

In the example in FIG. 8, client=user device 801 operated by a user wishes to access VM1 131 using domain name=www.xyz.com. In practice, a bring-your-own-device (BYOD) approach has allowed corporate users to have freedom of choice, such as smartphones, tablets and laptop computers. This way, users may choose to work from the office, or remotely. However, remote user devices or endpoints may be more challenging to control, which affect how they are authenticated and connected securely. Using a context-aware approach, access by user device 801 may be allowed or blocked based on client context information associated with user device 801.

(a) Context Information

At 810 in FIG. 8, user device management entity 160 may monitor various user devices including "U1" 801, and send client context information to authoritative controller 110. In practice, user device management entity 160 may be a mobile device management (MDM) entity that is responsible for managing, monitoring and securing mobile devices accessing resources in SDN environment 100. At 815 in FIG. 8, authoritative controller 110 may store or update the client context information in association with any identification information (e.g., device ID) associated with user device 801. See corresponding 705-715 in FIG. 7.

In the example in FIG. 8, client context information 815 may include one or more of the following (not all shown for simplicity): hardware profile information (e.g., device type=smartphone, manufacturer, etc.), software profile information (e.g., software version=1.0.3, software list=(s1, s2) specifying frequently-used applications, jailbreak status=yes, etc.), geographical location information (e.g., location=Sydney), user profile information (e.g., user's role and permission), etc. In one example, user device management entity 160 may interact with agent 802 running on user device 801 to collect client context information 815.

(b) Context-Aware DNS Query Handling

At 820-830 in FIG. 8, in response to detecting a DNS query initiated by user device 801 via DNS resolver 120, authoritative controller 110 may identify context-aware DNS record information 531-532 specifying domain name=www.xyz.com. At 840 in FIG. 4, authoritative controller 110 may detect a potential security threat associated with VM1 131 according to the example in FIG. 4. In this case, a remediation action is performed to redirect to standby IP address=IP-3 associated with "healthy" VM3 133 instead of "unhealthy" VM1 131.

Before allowing user device 801 to access VM3 133, authoritative controller 110 may identify client context information 815 to detect any potential security threat associated with user device 801. See corresponding blocks 730-760 in FIG. 7. To identify user device 801, one approach is to map a source IP address (e.g., IP-U1) in DNS query 820/830 to client context information 815. If any potential security threat is detected, access will be blocked according to block 770. Otherwise, access is allowed by generating and sending a DNS reply to user device 801 via DNS resolver 120 according to blocks 765 and 780-785.

Potential security threats may be detected in various scenarios. For example, the number of cache misses at DNS resolver 110 may be greater than a predetermined threshold based on DNS queries from user device 801. In another example, user device 801 may behave abnormally at runtime, such as by querying for domain names supported by external platforms (i.e., does not satisfy its intended state). Also, geographical location information associated with user device 801 may indicate that user device 801 is operating outside of its expected location. Further, a potential security threat may be detected based on software profile information (e.g., software version, software list, jailbreak status). The detection may also involve checking whether domain name=www.xyz.com and/or IP-U1 are included in a blacklist (see 754) or a whitelist (see 756). If found in the blacklist, access will be automatically blocked. If not found in the whitelist, access will also be automatically blocked.

At 850 in FIG. 8, a potential security threat associated with user device 801 is detected, such as based on jailbreak status=yes. In this case, access to standby VM3 133 will be blocked (see 860) and no DNS reply will be forwarded to DNS resolver 120. Additionally, (see 772), a notification may be generated and sent to user device management entity 160 to cause isolation of user device 801 using firewall rule(s).

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to implement a "network device" to perform connectivity check according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform context-aware domain name system (DNS) query handling, wherein the method comprises:
    detecting, by the computer system, a DNS query to translate a domain name, wherein the DNS query is initiated by a client requiring access to the domain name;
    identifying, by the computer system, DNS record information that translates the domain name to a network address assigned to a virtualized computing instance, wherein the virtualized computing instance is deployed external to the client;
    identifying, by the computer system, context information of the virtualized computing instance and mapped to the DNS record information, wherein the context information includes at least one of a health status associated with the virtualized computing instance and a runtime state and an intended state of the virtualized computing instance; and
    in response to detecting a potential security threat based on the context information, performing, by the computer system, a remediation action to block access to the virtualized computing instance;
    otherwise, generating and sending, by the computer system, a DNS reply specifying the network address assigned to allow access to the virtualized computing instance.

2. The method of claim 1, wherein detecting the potential security threat comprises:
    determining that the context information indicates a deviation between the runtime state and the intended state of the virtualized computing instance.

3. The method of claim 1, wherein detecting the potential security threat comprises:
    determining that the context information indicates the health status associated with the virtualized computing instance, wherein the health status is derivable based on one or more of the following: operating system (OS) kernel behavior information, process behavior information, process identifier (ID) information, network flow information, universally unique ID (UUID) information and network address information associated with the virtualized computing instance.

4. The method of claim 1, wherein performing the remediation action comprises:
    redirecting the client to a standby network address by generating and sending a DNS reply specifying the standby network address assigned to a standby virtualized computing instance.

5. The method of claim 4, wherein performing the remediation action comprises:
    translating the domain name to a standby domain name that is associated with the standby network address.

6. The method of claim 1, wherein the method further comprises:
    identifying client context information associated with the client; and
    in response to detecting a potential security threat associated with the client based on the client context information, blocking the client from accessing the virtualized computing instance.

7. The method of claim 6, wherein identifying the client context information comprises:
    identifying the client context information associated with the client in the form of a user device, wherein the client context information includes one or more of the following: hardware profile information, software profile information, geographical location information and user profile information.

8. A non-transitory computer-readable storage medium that includes a set of instructions which, in response to execution by a processor of a computer system, cause the processor to perform a method of context-aware domain name system (DNS) query handling, wherein the method comprises:
    detecting a DNS query to translate a domain name, wherein the DNS query is initiated by a client requiring access to the domain name;
    identifying DNS record information that translates the domain name to a network address assigned to a virtualized computing instance, wherein the virtualized computing instance is deployed external to the client;
    identifying context information of the virtualized computing instance and mapped to the DNS record information, wherein the context information includes at least one of a health status associated with the virtualized computing instance and a runtime state and an intended state of the virtualized computing instance; and
    in response to detecting a potential security threat based on the context information, performing a remediation action to block access to the virtualized computing instance;
    otherwise, generating and sending a DNS reply specifying the network address assigned to allow access to the virtualized computing instance.

9. The non-transitory computer-readable storage medium of claim 8, wherein detecting the potential security threat comprises:
    determining that the context information indicates a deviation between the runtime state and the intended state of the virtualized computing instance.

10. The non-transitory computer-readable storage medium of claim 8, wherein detecting the potential security threat comprises:
    determining that the context information indicates the health status associated with the virtualized computing instance, wherein the health status is derivable based on one or more of the following: operating system (OS) kernel behavior information, process behavior information, process identifier (ID) information, network flow information, universally unique ID (UUID) information and network address information associated with the virtualized computing instance.

11. The non-transitory computer-readable storage medium of claim 8, wherein performing the remediation action comprises:
redirecting the client to a standby network address by generating and sending a DNS reply specifying the standby network address assigned to a standby virtualized computing instance.

12. The non-transitory computer-readable storage medium of claim 11, wherein performing the remediation action comprises:
translating the domain name to a standby domain name that is associated with the standby network address.

13. The non-transitory computer-readable storage medium of claim 8, wherein the method further comprises:
identifying client context information associated with the client; and
in response to detecting a potential security threat associated with the client based on the client context information, blocking the client from accessing the virtualized computing instance.

14. The non-transitory computer-readable storage medium of claim 13, wherein identifying the client context information comprises:
identifying the client context information associated with the client in the form of a user device, wherein the client context information includes one or more of the following: hardware profile information, software profile information, geographical location information and user profile information.

15. A computer system configured to perform context-aware domain name system (DNS) query handling, wherein the computer system comprises:
a processor; and
a non-transitory computer-readable medium having stored thereon instructions that, when executed by the processor, cause the processor to:
detect a DNS query to translate a domain name, wherein the DNS query is initiated by a client requiring access to the domain name;
identify DNS record information that translates the domain name to a network address assigned to a virtualized computing instance, wherein the virtualized computing instance is deployed external to the client;
identify context information of the virtualized computing instance and mapped to the DNS record information, wherein the context information includes at least one of a health status associated with the virtualized computing instance and a runtime state and an intended state of the virtualized computing instance; and
in response to detecting a potential security threat based on the context information, perform a remediation action to block access to the virtualized computing instance;
otherwise, generate and send a DNS reply specifying the network address assigned to allow access to the virtualized computing instance.

16. The computer system of claim 15, wherein the instructions for detecting the potential security threat cause the processor to:
determine that the context information indicates a deviation between the runtime state and the intended state of the virtualized computing instance.

17. The computer system of claim 15, wherein the instructions for detecting the potential security threat cause the processor to:
determine that the context information indicates the health status associated with the virtualized computing instance, wherein the health status is derivable based on one or more of the following: operating system (OS) kernel behavior information, process behavior information, process identifier (ID) information, network flow information, universally unique ID (UUID) information and network address information associated with the virtualized computing instance.

18. The computer system of claim 15, wherein the instructions for performing the remediation action cause the processor to:
redirect the client to a standby network address by generating and sending a DNS reply specifying the standby network address assigned to a standby virtualized computing instance.

19. The computer system of claim 18, wherein the instructions for performing the remediation action cause the processor to:
translate the domain name to a standby domain name that is associated with the standby network address.

20. The computer system of claim 15, wherein the instructions further cause the processor to:
identify client context information associated with the client; and
in response to detecting a potential security threat associated with the client based on the client context information, block the client from accessing the virtualized computing instance.

21. The computer system of claim 20, wherein the instructions for identifying the client context information cause the processor to:
identify the client context information associated with the client in the form of a user device, wherein the client context information includes one or more of the following: hardware profile information, software profile information, geographical location information and user profile information.

* * * * *